US012782189B2

(12) United States Patent
Lee et al.

(10) Patent No.: US 12,782,189 B2
(45) Date of Patent: Nov. 3, 2026

(54) VEHICLE SITUATION DETERMINATION METHOD USING ACOUSTIC DATA AND LOW-FREQUENCY REMOVAL FILTER

(71) Applicants: HYUNDAI MOTOR COMPANY, Seoul (KR); KIA CORPORATION, Seoul (KR)

(72) Inventors: Dong-Chul Lee, Anyang-si (KR); Kyoung-Jin Noh, Hwaseong-si (KR); In-Soo Jung, Goyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 222 days.

(21) Appl. No.: 18/613,958

(22) Filed: Mar. 22, 2024

(65) Prior Publication Data

US 2025/0085158 A1 Mar. 13, 2025

(30) Foreign Application Priority Data

Sep. 11, 2023 (KR) ........................ 10-2023-0120190

(51) Int. Cl.

| | |
|---|---|
| ***G01H 3/06*** | (2006.01) |
| ***B60Q 5/00*** | (2006.01) |
| ***G07C 5/08*** | (2006.01) |
| ***H04R 1/02*** | (2006.01) |
| ***H04R 3/04*** | (2006.01) |

(52) U.S. Cl.
CPC ................. *G01H 3/06* (2013.01); *B60Q 5/00* (2013.01); *G07C 5/0808* (2013.01); *H04R 1/025* (2013.01); *H04R 3/04* (2013.01); *H04R 2499/13* (2013.01)

(58) Field of Classification Search
CPC .......... G01H 3/06; B60Q 5/00; G07C 5/0808; H04R 1/025; H04R 3/04; H04R 2499/13
See application file for complete search history.

(56) References Cited

U.S. PATENT DOCUMENTS

| | | | | |
|---|---|---|---|---|
| 11,492,005 | B1 | 11/2022 | Bond | |
| 11,494,643 | B2 | 11/2022 | Lee et al. | |
| 2008/0273715 | A1* | 11/2008 | Snider | B60R 11/0217 381/86 |
| 2013/0070928 | A1* | 3/2013 | Ellis | H04R 25/30 381/56 |
| 2015/0137998 | A1* | 5/2015 | Marti | H04K 3/45 340/901 |
| 2021/0012594 | A1* | 1/2021 | Canpolat | H04W 76/50 |
| 2022/0279276 | A1* | 9/2022 | Robinson | H04R 3/12 |
| 2023/0260341 | A1* | 8/2023 | Lee | G07C 5/0833 701/29.1 |

FOREIGN PATENT DOCUMENTS

| | | |
|---|---|---|
| KR | 10-2020-0075148 | 6/2020 |

* cited by examiner

*Primary Examiner* — Daniel R Sellers
(74) *Attorney, Agent, or Firm* — Fish & Richardson P.C.

(57) ABSTRACT

A method of determining a vehicle situation using acoustic data and a low-frequency removal filter includes a step of acquiring, in an auditory sensor section mounted on a vehicle, acoustic data generated from the outside of the vehicle, a preprocessing step of removing, in a calculation section, low-frequency components from the acoustic data; and a step of calculating and determining, in the calculation section, an outside-of-vehicle situation event by using the preprocessed acoustic data.

14 Claims, 7 Drawing Sheets

VEHICLE SITUATION DETERMINATION METHOD USING ACOUSTIC DATA AND LOW-FREQUENCY REMOVAL FILTER

CROSS-REFERENCE TO RELATED APPLICATION

This application claims priority to Korean Patent Application No. 10-2023-0120190, filed on Sep. 11, 2023, which is incorporated herein by reference in its entirety.

TECHNICAL FIELD

The present disclosure relates to a method of determining the situation of a vehicle using acoustic data and a low-frequency removal filter and, more particularly, to a method of determining the external situation of a vehicle using an auditory sensor section mounted on the vehicle.

BACKGROUND

The convergence of automotive and Information & Communication Technology (ICT) is gradually leading to the intelligent and sophisticated vehicles. In addition, autonomous driving-related technologies and associated driving safety assistance systems are being developed by applying visual (image) analysis and voice recognition technologies, and safe driving assistance systems implemented in vehicles recognize dangerous situations and perform actions to notify the driver.

Accordingly, research is underway to apply situation diagnosis or recognition technologies through visual image analysis to mobility technologies, especially those related to autonomous driving or driving safety assistance. In addition, a voice recognition technology is being researched mainly for user convenience in the interior.

Recently, various types of information collection equipment and technologies using them are being developed to gain technological advantage in future mobility technologies. In addition, a vision recognition image determination technology using Lidar sensors or a camera and an artificial intelligence technology applied thereto are being actively researched and developed, and in particular, technologies related to sight in the five human senses, such as indoor voice recognition technologies and tactile (haptic) technologies, have already been technologically advanced and are being diversely applied to vehicles. Recently, there have been attempts to make technological advances in future mobility through accurate analysis of the information contained in acoustic data. While visual information such as images is also important for accurate situational determination, determination based on acoustic data analysis is becoming increasingly important. In other words, in the future mobility industry such as autonomous driving and UAM, in addition to image analysis, there is increasing interest in technologies in the field of auditory recognition such as voice recognition.

SUMMARY

The present disclosure is intended to propose a method of diagnosing and determining an event that has occurred outside a vehicle from acoustic data collected from the outside of the vehicle.

In an aspect, the present disclosure provides a method of determining a vehicle situation using acoustic data and a low-frequency removal filter, the method including: a step of acquiring, in an auditory sensor section mounted on a vehicle, acoustic data generated from the outside of the vehicle; a preprocessing step of removing, in a calculation section, low-frequency components from the acoustic data; and a step of calculating and determining, in the calculation section, an outside-of-vehicle situation event by using the preprocessed acoustic data.

The preprocessing step of removing low-frequency components may include applying a Chebyshev filter, wherein the Chebyshev filter may first remove low-frequency components through a high pass filter, and then sequentially remove low-frequency components proportional to vehicle speed while changing the order of the Chebyshev filter.

Furthermore, the preprocessing step of removing low-frequency components may be applied with a time-frequency masking algorithm.

The auditory sensor section may be configured to acquire acoustic data of the time difference, azimuth, and altitude of the event, and store the acoustic data in a collection section. The calculation section may be configured to calculate and determine at least one of a distance between the vehicle and the event, a location where the event occurs, and a type of event to acquire the outside-of-vehicle situation, and a communication section may be configured to transmit the outside-of-vehicle situation information to an outside-of-vehicle object.

The outside-of-vehicle situation event may be targeted to in-wheel motors of the vehicle, and the auditory sensor section may be mounted on the interior ceiling of the vehicle at a vertically oriented position with respect to each of the in-wheel motors.

In the case of targeting an engine or driving motor of the vehicle, the auditory sensor section may be mounted on the interior ceiling of the vehicle at a central portion.

An order analysis technique including an RPM (Rotations Per Minute)—Frequency map may be applied to diagnose the condition of rotating parts of the vehicle.

The auditory sensor section may include an interior microphone located inside of the vehicle and a speaker located on the exterior of a vehicle body, and may transmit messages from a vehicle occupant from the vehicle interior to an outside-of-vehicle object.

The auditory sensor section may include a microphone located on the exterior of a vehicle body, and a speaker located inside of the vehicle, and may transmit messages from the outside-of-vehicle object to the vehicle interior. Here, the outside-of-vehicle object refers to a rescuer or a rescue vehicle.

The present disclosure is the basic technology that enables the development of various platforms by analyzing, diagnosing, and determining acoustic data collected from a vehicle. The present disclosure enables the development of more advanced future technologies by using acoustic data to determine various situations that are difficult to determine by sight and touch during an autonomous driving mode or a general driver-driving mode.

In addition, the present disclosure enables the collection of external acoustic signal data and the collection of time difference/frequency range/azimuth angle information required for a situation determination technology, and can be applied to a vehicle in a minimized size applicable to the vehicle.

Furthermore, the present disclosure can be expanded into a secondary platform business depending on the event situation (type). That is, the present disclosure can share necessary information with major government offices in real time. In addition, the present disclosure enables building of a business model by sharing information with neighboring vehicles, insurance-related companies, and regions in the event of a dangerous or emergency situation.

DETAILED DESCRIPTION

Figure 1A:
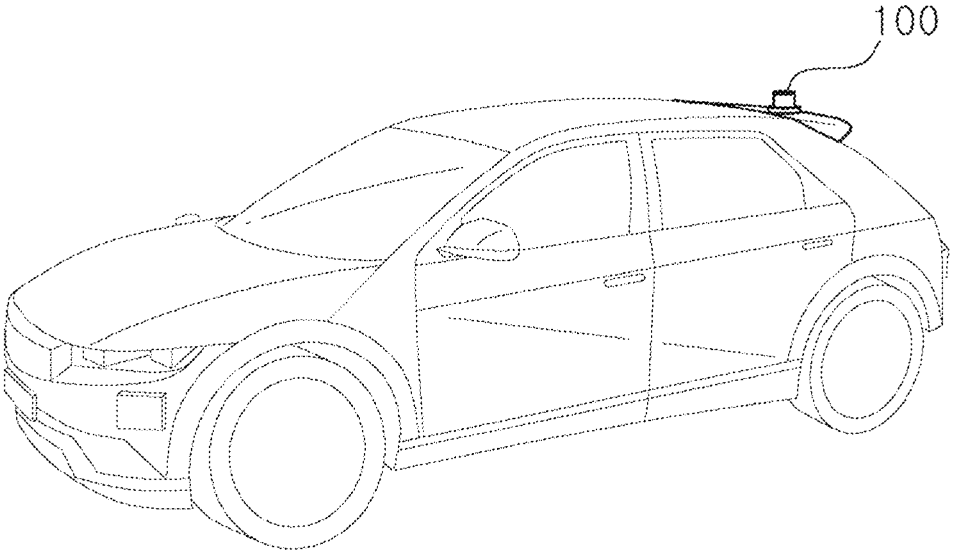
FIG. 1A is a diagram illustrating an example of a position of an auditory sensor section in a vehicle.
Figure 1B:
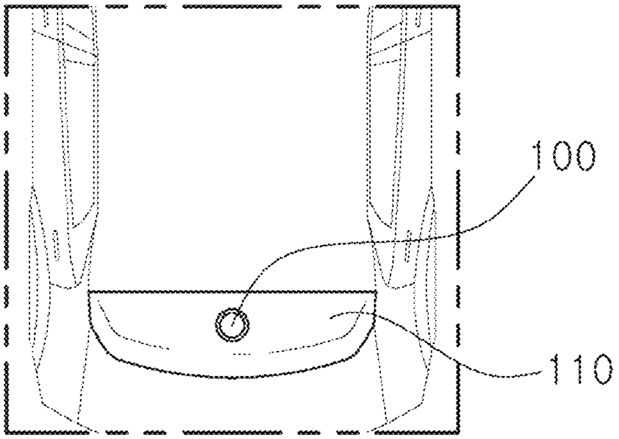
FIG. 1B is a diagram illustrating an example of a position of the auditory sensor section on a front-to-back centerline that is also laterally symmetrical at the rear of the ceiling of the vehicle.

FIG. 1A illustrates the position of an auditory sensor section in a vehicle. The position of the auditory sensor section is located in an area that is out of the range of human vision, such as in the ceiling or the rear of an outer surface of a vehicle body, and the rear position of the ceiling is most preferred. FIG. 1B illustrates the position of the auditory sensor section on a front-to-back centerline that is also laterally symmetrical at the rear of the ceiling of the vehicle. Since the position of events occurring outside of the vehicle needs to be determined relative to the vehicle, the auditory sensor section is preferably positioned on the centerline with reference to the width of the vehicle.

Figure 2A:
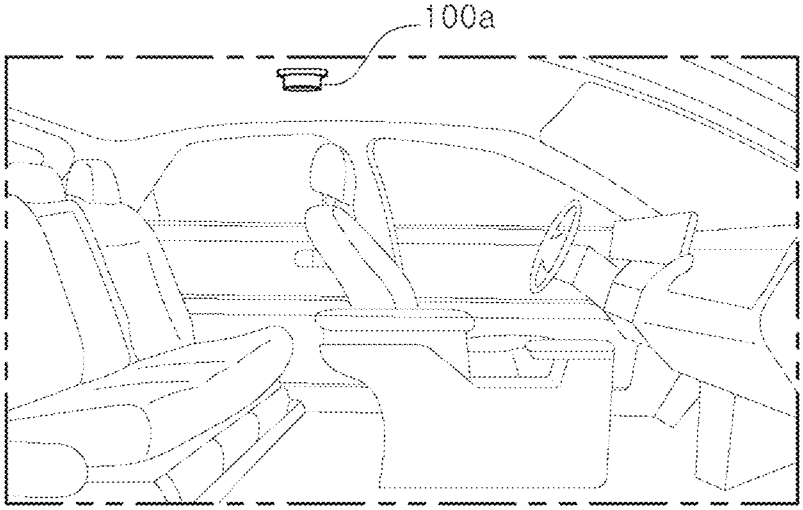
FIG. 2A is a diagram illustrating an example of a position of the auditory sensor section in the center of the interior ceiling of the vehicle.
Figure 2B:
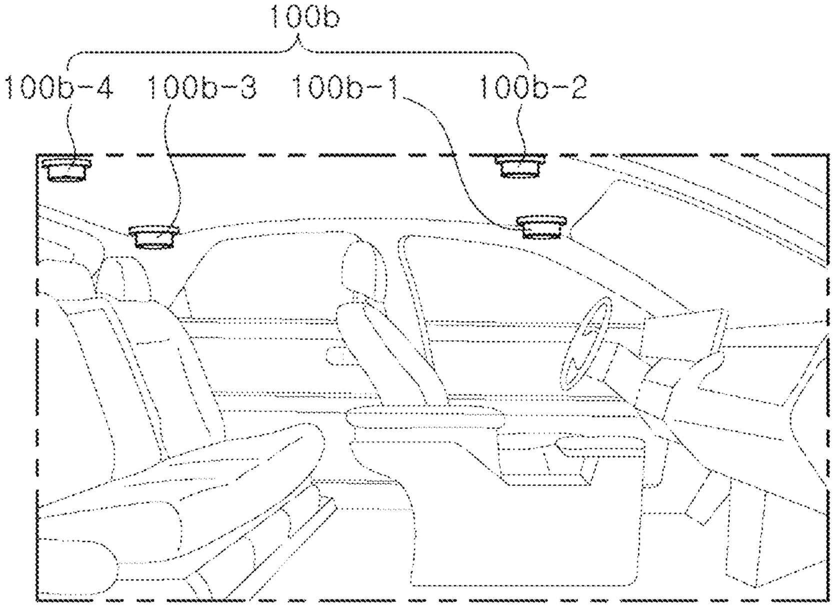
FIG. 2B is a diagram illustrating an example of positions of the auditory sensor sections in the interior ceiling of the vehicle in a direction perpendicular to four wheels of the vehicle.

FIG. 2A illustrates the position of the auditory sensor section in the center of the interior ceiling of the vehicle, and FIG. 2B illustrates the positions of the auditory sensor sections in the interior ceiling of the vehicle in a direction perpendicular to four wheels of the vehicle. In FIG. 2, a sound generated by an engine, a driving motor, or vehicle wheels is preferably measured in the interior of the vehicle.

The auditory sensor section may have a lidar-like cylindrical shape, which is familiar to and generally has identification with the overall appearance of an autonomous vehicle. On the other hand, the auditory sensor section may be designed to be lower than the height of lidar in consideration of aerodynamic drag, or to be inclined or streamlined to provide aerodynamic drag reduction. A tailgate 110 at the rear of the vehicle may be selected as a preferred position for the auditory sensor section.

That is, the acoustic data collected by the auditory sensor section is used to analyze various events occurring outside of the vehicle to estimate the positions of the events and a relative distance from the vehicle. The position and relative distance of the event may be used as useful information not only for the driver and vehicle operation, but also for all purposes in the exterior of the vehicle, if transmitted thereto.

The auditory sensor section may be a sensor detecting audible sound waves, ultrasonic waves, or microwaves, such as a microphone, a sonar, a radar sensor, or the like. The present disclosure illustrates an array of multi-channel microphones, wherein microphone holes are circumferentially formed at an edge on an upper surface of a cylindrical shape, and the multi-channel microphones are respectively disposed in the microphone holes.

The spacing between the multi-channel microphones is set in consideration of the maximum frequency band of the acoustic data. The frequency of the acoustic data collected from the external event is determined according to the event to be diagnosed, and the collected acoustic data estimates the distance between the event and the vehicle from the time difference, and the position of the event from the azimuth. The distance (d) between the microphones should be less than $\lambda_{min}/2$, which is ½ times the minimum wavelength of a sound source. The spacing (d) of the multi-channel microphones in array should satisfy the following Equation.

$$d < \frac{\lambda_{min}}{2} \qquad \text{Equation 1}$$

where d is the spacing between the microphones in array and $\lambda_{min}$ is the minimum wavelength of the sound source.

The above Equation is based on the Nyquist sampling theorem and the Fourier Transform, which means that the distance between the microphones in array should be less than half the minimum wavelength of the sound source to achieve localization. In other words, the localization is a technique that precisely reduces the interval to obtain an accurate position of an event on the basis of a previously acquired 3D map.

The spacing between the multi-channel microphones creates time difference that may be used to estimate a distance. An azimuth may be calculated from microphone-collected data to estimate the position of the event.

For example, to apply to the average frequency of 10000 Hz and the maximum frequency of 12 kHz of the inverter noise, since Vair is 400 m/s, λmin is 400/10000 and 400/12000, respectively, so the distance (d) between the microphones should be less than 1.7 cm and 1.42 cm, respectively.

Figure 3:
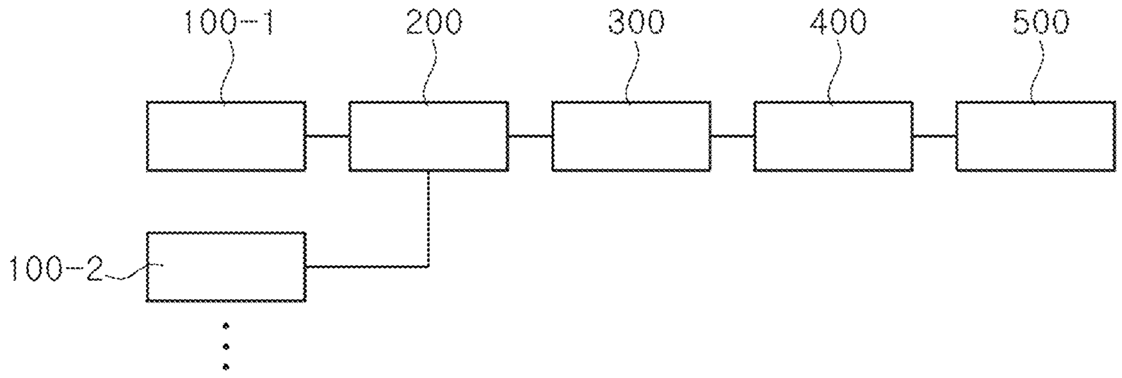
FIG. 3 is a block diagram illustrating an example of an auditory information-based vehicle situation determination system.

FIG. 3 is a block diagram illustrating an auditory information-based vehicle situation determination system. Referring to FIG. 3, a vehicle situation determination system of the present disclosure may include an auditory sensor section, including first to n-$^{th}$ auditory sensors 100-1 to **100-*n*, detecting acoustic data, a collection section 200 collecting the acoustic data, a calculation section 300 generating event information about a current situation by using the acoustic data, a communication section 400 transmitting the event information about a current situation to a communication network, an object 500** outside of the vehicle that receives the event information about a current situation and utilizes the event information about a current situation for other purposes, and the like.

The first to n-$^{th}$ auditory sensors 100-1 to **100-*n*** are disposed at certain intervals or in certain areas outside of and/or inside of the vehicle to acquire acoustic data from events occurring inside and/or outside the vehicle. The events may be emergency vehicles (e.g., fire trucks, ambulances, police cars, etc.), danger signals (e.g., distress calls, gunshots, collision sounds, etc.), driving safety (e.g., sounds of two-wheelers, students in a school zone, etc.), or the like.

The auditory sensor section detects and measures time difference, azimuth, and altitude, and the acoustic data measured by the auditory sensor section is stored in the collection section 200.

The collection section 200 is connected to the first to the n-$^{th}$ auditory sensors 100-1 to 100-$n$ to collect the acoustic data.

The calculation section 300, implemented using one or more computing devices, performs a function of calculating and determining event information about a current situation by using the acoustic data. In other words, the calculation section 300 uses the acoustic data generated by the first to n-$^{th}$ auditory sensors 100-1 to 100-$n$ to generate the event information about a current situation, such as a distance between the traveling vehicle equipped with the auditory sensor section and an outside-of-vehicle situation event, a position of the event, event type, and a state of certain parts of the vehicle.

In addition, the calculation section 300 may provide driving guidance based on a change in the distance between the position at which the type of event is detected and the currently traveling vehicle. Of course, in this case, the calculation section may be associated with a navigation system.

On the other hand, the calculation section 300 may diagnose certain major components configured for mobility to determine their current state. For example, such parts may be an in-wheel motor.

The outside-of-vehicle information that is the result of the calculation and determination of the event in the calculation section 300 may be transmitted to an outside-of-vehicle object 500 via the communication section 400. The outside-of-vehicle object 500 may receive the current situation information and provide the current situation information to other outside-of-vehicle objects. If the outside-of-vehicle object 500 is a management server, it can receive and utilize information using vehicle-to-vehicle communication, information from major government offices, technical information based on an insurance company-linked B2B platform, and the like. To accomplish this, the management server may be associated with other external servers. Examples include a carrier server, an insurance company server, a government office server, a shared server, and the like. The outside-of-vehicle object 500 may be a rescuer or a rescue vehicle.

The acoustic data from the outside of the vehicle collected in the collection section 200 via the auditory sensor section 100 is utilized as input data for deep learning in the calculation section 300. The calculation section 300 removes unwanted low-frequency components, such as wind noise or road noise, as a preprocessing process before being used as deep learning input data. This is because wind noise is input in the low-frequency band and is proportional to vehicle speed, so it has a high potential to distort the input signal information.

The primary method of removing low-frequency components is to apply a Chebyshev filter. The Chebyshev filter optimizes the frequency response while satisfying certain requirements of the passband and stopband in a given frequency band. The Chebyshev filter is useful for reducing high-frequency noise and signal distortion, and may be designed depending on the requirements of the passband and stopband.

After the primary removal of the low-frequency components through a high pass filter, the low-frequency components proportional to the vehicle speed are sequentially removed by changing the order of the Chebyshev filter.

As a secondary method of removing low-frequency components, a time-frequency masking algorithm is applied. Time-frequency masking is used to recover the intelligibility and quality of noisy sound that has been degraded by background noise, by removing a portion of the signal in the time-frequency domain. A new acoustic signal is generated after masking the portion of the signal to be removed from the magnitude spectrogram, which represents the magnitude of the frequency component of the signal over time.

In other words, the calculation section 300 may simultaneously or selectively apply a Chebyshev filter and a time-frequency masking algorithm to remove low-frequency components as a preprocessing process on the input data. The acoustic data from which the low-frequency components have been removed through the preprocessing process is used as input data for deep learning.

Figure 4:
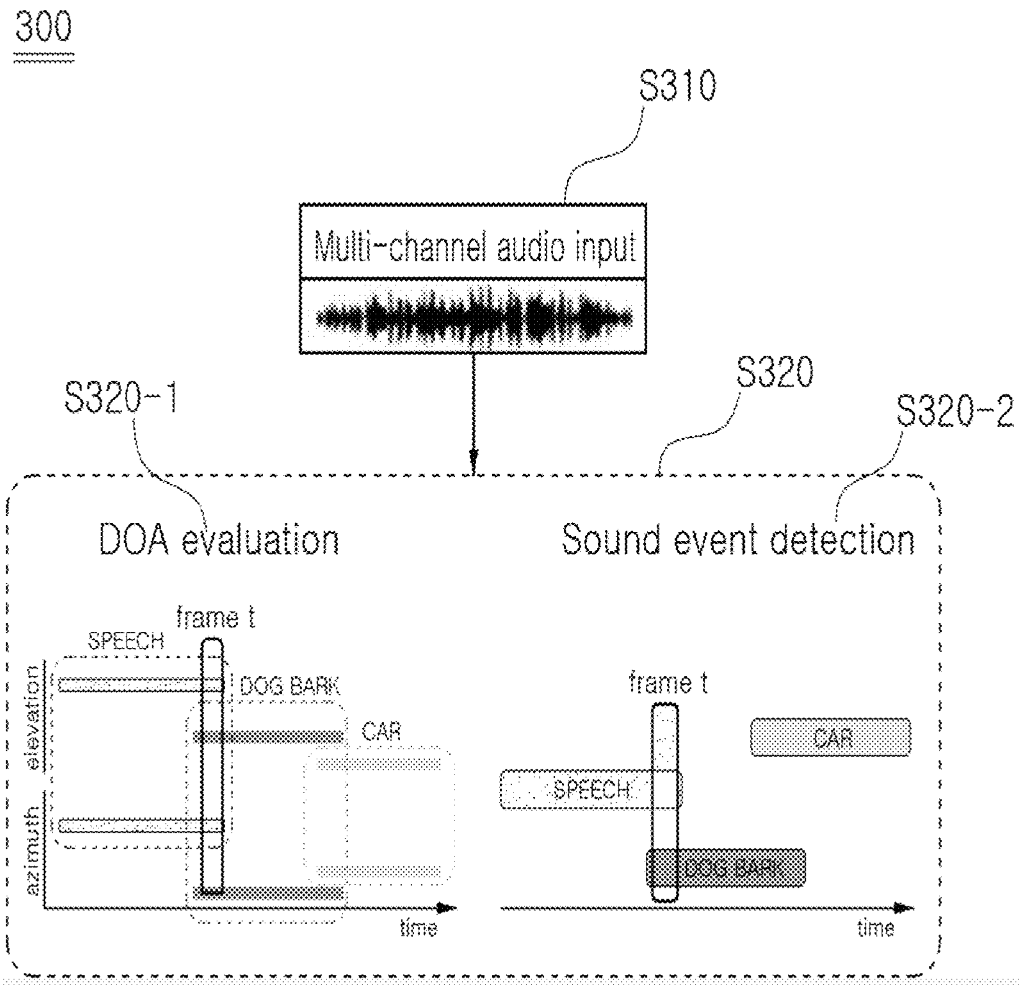
FIG. 4 is a diagram illustrating an example of a process of Direction Of Arrival (DOA) estimation and acoustic event detection from input data.

FIG. 4 is a conceptual diagram illustrating the process of Direction Of Arrival (DOA) estimation and acoustic event detection from the acoustic data from which low-frequency components have been removed by the preprocessing process in the calculation section 300. First, acoustic data acquired from the auditory sensor section is input (S310). A multi-channel microphone may be disposed within the auditory sensor section, or a plurality of auditory sensor sections may be disposed. Then, DOA is evaluated for each sound from the input acoustic data, and an event is detected (S320). For example, in the DOA evaluation step, time difference, azimuth, and altitude are calculated for speech, dog bark, and vehicle sound (S320-1), and in the event detection step, already learned events are determined according to the vehicle situation (S320-2).

Localizing an event after DOA evaluation, and determining and detecting the type of the event is performed in the calculation section 300 in FIG. 3. That is, when an event occurs, the incident angle information of speech, dog bark, vehicle sound, etc. is estimated using azimuth and elevation, and the type of the occurred event is determined and detected.

Figure 5:
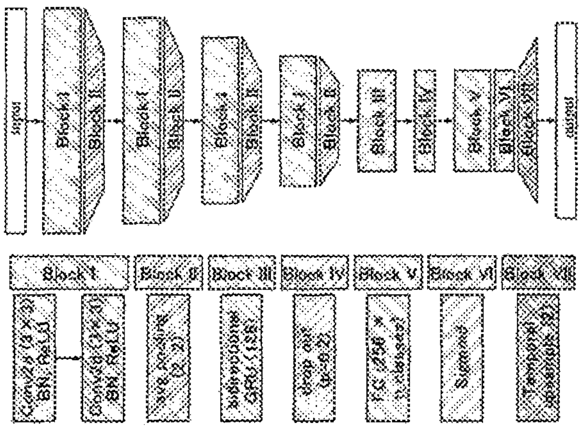
FIG. 5 is diagram illustrating an example of an architecture for the DOA estimation and event detection illustrated in FIG. 4.

FIG. 5 is an architecture for the DOA estimation and sound event detection illustrated in FIG. 4. Referring to FIG. 5, the input size is "n_channels×n_frames×n_features" and the output size is "n_frames×n-classes". For this purpose, seven process blocks (Blocks I to VII) are organized between the input and output.

For process block I, Batch Normalization (BN), Rectifier Linear Unit (ReLU), etc. are applied. BN is a technique to accelerate and stabilize the training of a neural network. ReLU is an activation function in which if the input value is less than 0, 0 is output, and if the input value is greater than 0, it is output as it is.

For process Block II, average pooling is applied to reduce the acoustic data into smaller sound source.

For process Block III, a bidirectional Gated Recurrent Unit (GRU) is applied. In the GRU, there are only two gates, an update gate and a reset gate, and the bidirectional GRU injects the same information into a recursive network in different directions to improve accuracy and retain memory.

For process Block IV, dropout is used to engage only some of the weights in the layer instead of engaging all of them in the calculation. Dropout is a way to partially omit neurons in a neural network to address overfitting of a model.

The preprocessed temporal and spatial data are associated with the existing training weights and used in the final training stage. Of course, the temporal and/or spatial data is generated and then preprocessed.

Process Block V refers to a fully connected neural network, where every node (neuron) in each layer is connected to every node in the next layer without any exception. This layer is used in neural network to connect both input and output. Each connection between input and output contains a weight, which indicates the strength of connection.

For process Block VI, the trained results are output in the form of a sigmoid. Sigmoid is a function that shows a smooth sigmoid curve similar to an S-shape.

The outside-of-vehicle event to be estimated through deep learning is the distance and position of the event that occurred from the traveling vehicle, and in order to determine the type of event, type-specific data should be collected and trained.

Outside-of-vehicle events targeted by the present disclosure may be categorized into emergency vehicles, such as fire trucks, ambulances, police cars, etc., danger signals, such as rescue calls, gunshots, collisions, etc., and driving safety, such as sounds of two-wheelers, students in school zones, etc. Information, such as route guidance, etc. may be sent to a corresponding traveling vehicle as well as to an external object by changing the distance and position of the event. In emergency situations, such as when a vehicle door cannot be opened or closed or when there is activity problem in the vehicle occupants due to an accident, it can also be applied as an additional function to allow for transmission/reception of voice messages between the interior and exterior of a vehicle. It is also possible to diagnose the condition of specific parts of future mobility vehicles, such as in-wheel motors, by diagnosing the condition of the vehicle. In other words, event detection may also be used to provide information using vehicle-to-vehicle communication, provide information to major government offices, and provide technical information based on B2B platforms linked to insurance companies.

The accuracy of a model may be improved by minimizing outlier data that deviates from the standard or trend through feature distribution analysis for classification according to outside-of-vehicle events before training. In addition, statistical analysis of sound characteristics for event classification is applied to pre- and post-processing. That is, sounds that occur only in a certain frequency band are determined by weighting the features and event classification results extracted from the corresponding frequency band, and sounds that occur only below or above a certain length (wavelength) are analyzed for length in post-processing, and then the final event classification results are determined by reflecting the reliability. In the context of data, reliability means that the results of the measurement are consistent.

In the case of sounds containing human speech, speech pronunciation information may be important to determine the event situation. Therefore, the accuracy of the event can be further improved by determining the situation while integrating the speech recognition results.

In the case of vehicle condition diagnosis, order analysis techniques including RPM-Frequency maps may be applied to data feature extraction to analyze the order information of a sound to be diagnosed. The order analysis techniques have the advantage of making the event target clearer by extracting data based on motor or engine revolutions.

By determining the surrounding environment in combination of sound recognition results and excluding sounds that could not occur in the environment from the estimation results, the accuracy of determination may be improved. In other words, robustness may be secured by applying a pre-training model.

In the case of broadcast or music contents, various sounds may occur and confuse the determination of sound and surroundings, so it is possible to mitigate the misperception result caused by the contents by determining the current situation based on the perceived sound. For this purpose, it is possible to apply an algorithm for determining music/sound related contents of in-vehicle audio or smart devices.

A first implementation to which the present disclosure is applicable is an artificial intelligence model for determining the situation outside of a vehicle by using an auditory sensor section and a low-frequency noise removal filter. The outside-of-vehicle object 500 is extensible to a related major agency information sharing platform business according to the classification (type) of outside-of-vehicle events, and utilizes a vehicle information sharing system server or a carrier information sharing network.

The outside-of-vehicle object 500 is a pre-input emergency contact network as a linkage model that can share information about the outside-of-vehicle situation, link situation information according to time, location, and diagnosis results between individual persons or vehicles, and dispatch a vehicle from a repair shop when necessary, and can be extended to linkage with insurance companies.

In the case of a major event type such as a large-scale explosion or disaster, the present disclosure may provide a platform that can automatically report to the relevant government offices according to the situation determination result, such as dispatching an ambulance, fire truck, or police car. The outside-of-vehicle object 500 is a relief vehicle or a government office.

For the purpose of sharing information between vehicles, information can be shared with neighboring vehicles according to the situation determination results, and when obtaining information data at a level that reflects real-time road conditions, navigation can be reflected. The outside-of-vehicle object 500 is a neighboring vehicle.

The present disclosure may extend the technical coverage to a function of transmitting and receiving speech information about communication between the driver and outside-of-vehicle environment in the event of an emergency situation inside or outside of the vehicle. An additional single-channel speaker can be applied to the external auditory sensor section to transmit internal voice to the outside. For example, the technology can be applied to eliminate secondary hazards by communicating with external helpers or conveying information about the situation in the event that the doors cannot be opened or closed due to a vehicle accident or in the event that occupants, including the driver/passenger, cannot get out of the vehicle due to an emergency. In other words, the external auditory sensor section recognizes the voice or sound of a rescuer or rescue vehicle that has arrived outside of the vehicle and provides information to the vehicle occupants who need help, and the internal vehicle audio system transmits the microphone signal of the external auditory sensor section to the interior of the vehicle through speech recognition and transmits the internal indoor microphone signal to the external speaker.

In other words, the auditory sensor section includes an interior microphone inside of the vehicle and a speaker outside of the vehicle, and conveys a message from a vehicle occupant from the inside to outside of the vehicle. In addition, the auditory sensor section includes a microphone outside of the vehicle and a speaker inside of the vehicle, and conveys a message from a rescuer or a rescue vehicle from the outside to inside of the vehicle.

The present disclosure may be applied to a technology for diagnosing and predicting the conditions of individually driven motors in an in-wheel motor system of future mobility. When the auditory sensor section is mounted on the outside of the vehicle ceiling as illustrated in FIG. 1, both the estimation of outside-of-vehicle events and the condition diagnosis of the in-wheel motor may be performed simultaneously. When the auditory sensor section is mounted in the center of the interior ceiling of the vehicle as illustrated in FIG. 2A, a single microphone array structure can be used to diagnose the incoming-noise conditions and estimate the positions of respective in-wheel motors. When the auditory sensor section is mounted at four points on the interior ceiling of the vehicle, i.e., four points in the vertical direction of the four in-wheel motors, as illustrated in FIG. 2B, noise may be measured at the closest distance to the in-wheel motors, and when applied simultaneously with active noise control (ANC) or active noise control-road (ANCr) control, cross-validation of the measured frequency range and control performance is required. If an auditory sensor section is applied internally, the auditory sensor section may be used to perform in-wheel motor condition diagnosis, and speech recognition and independent space control by interior microphones.

What is claimed is:

1. A method of determining a state of a vehicle using acoustic data and a low-frequency removal filter, the method comprising:

acquiring, by an auditory sensor disposed at the vehicle, acoustic data generated from an outside of the vehicle;

removing, by a calculation section, a low-frequency component from the acoustic data, the calculation section being implemented using one or more computing devices; and determining, by the calculation section, an external vehicle situation event based on the acoustic data from which the low-frequency component is removed, wherein removing the low-frequency components comprises applying a time-frequency masking algorithm to the acoustic data.

2. The method according to claim 1, wherein the auditory sensor is disposed at a rear side of the vehicle.

3. The method according to claim 1, wherein removing the low-frequency component comprises applying a Chebyshev filter to the acoustic data.

4. The method according to claim 3, wherein applying the Chebyshev filter comprises (i) removing the low-frequency component through a high pass filter and, (ii) while adjusting an order of the Chebyshev filter, sequentially removing a low-frequency component corresponding to vehicle speed.

5. The method according to claim 1, wherein the auditory sensor is configured to measure a time difference, an azimuth, and an altitude of the external vehicle situation event.

6. The method according to claim 5, wherein the calculation section is configured to determine at least one of a distance between the vehicle and the external vehicle situation event, a location at which the external vehicle situation event occurs, or a type of the external vehicle situation event.

7. The method according to claim 5, wherein the external vehicle situation event is related to operations of in-wheel motors of the vehicle, and the auditory sensor is disposed at an interior ceiling of the vehicle at a vertically oriented position with respect to each of the in-wheel motors.

8. The method according to claim 7, wherein an order analysis technique including a rotation per minute (RPM)-Frequency map is applied to the acoustic data to determine a condition of one or more rotating parts of the vehicle.

9. The method according to claim 1, wherein the external vehicle situation event is related to an engine or driving motor of the vehicle, and the auditory sensor is disposed at an interior ceiling of the vehicle and at a central portion of the interior ceiling.

10. The method according to claim 1, further comprising transmitting, through a transceiver, information regarding the external vehicle situation event to an external object.

11. The method according to claim 10, wherein the auditory sensor comprises an interior microphone disposed at an inside of the vehicle and a speaker disposed at an exterior of the vehicle, and wherein the auditory sensor is configured to transmit, to the external object, data from an occupant located at the inside of the vehicle.

12. The method according to claim 11, wherein the external object is a rescuer or a rescue vehicle.

13. The method according to claim 10, wherein the auditory sensor comprises a microphone disposed at an exterior of the vehicle and a speaker disposed at an inside of the vehicle, and wherein the auditory sensor is configured to forward, to the vehicle, data from the external object.

14. The method according to claim 13, wherein the external object is a rescuer or a rescue vehicle.

* * * * *